Feb. 20, 1951     P. F. DESCH     2,542,638
FREQUENCY RESPONSIVE APPARATUS
Filed March 29, 1949
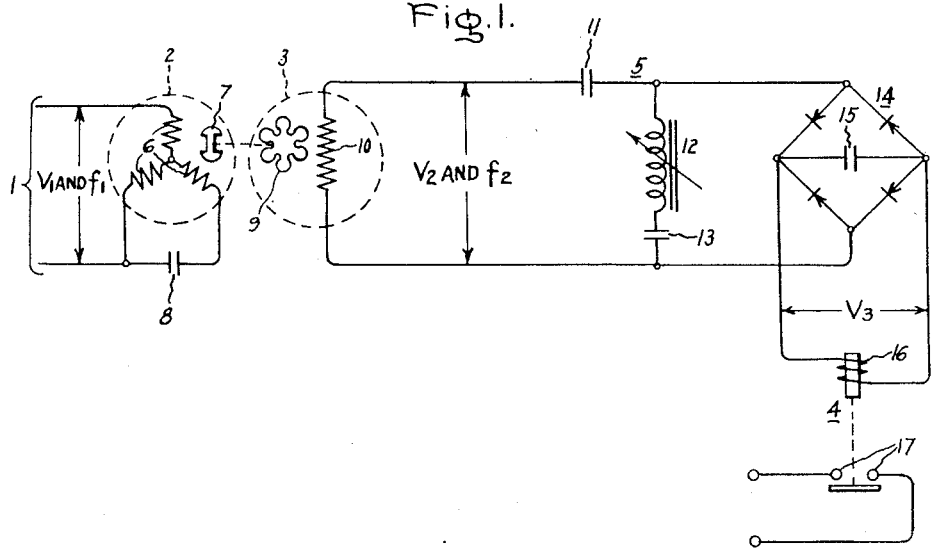
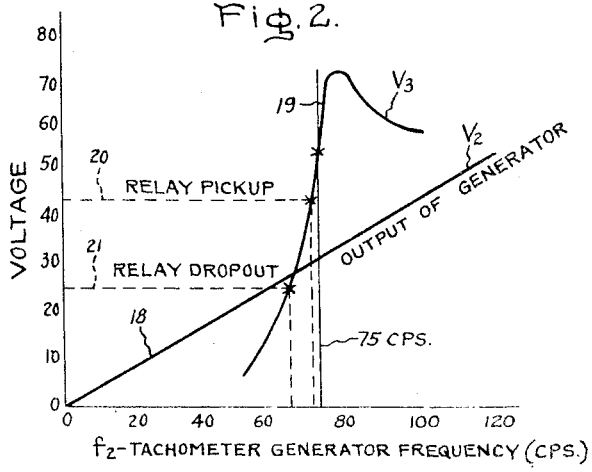
Inventor:
Philip F. Desch,
by
His Attorney Patented Feb. 20, 1951

2,542,638

UNITED STATES PATENT OFFICE 2,542,638

FREQUENCY RESPONSIVE APPARATUS

Philip F. Desch, Schenectady, N. Y., assignor to General Electric Company, a corporation of New York Application March 29, 1949, Serial No. 84,178

4 Claims. (Cl. 175—320)

My invention relates to frequency-responsive electric control systems, and has as its principal object to provide a new and improved apparatus for detecting predetermined values of frequency in an alternating current electric power system wherein the voltage is not constant but tends to fluctuate over a relatively wide range due to regulation or other causes. The apparatus of my invention, which operates with substantial independence of applied voltage over a considerable voltage range, has found particular application in connection with electric locomotives, which are frequently supplied from isolated power systems having relatively poor regulation of frequency and voltage. Such locomotives are frequently provided with motor-generator converting apparatus of relatively large size, which must be operated within narrow speed (i. e., frequency) limits, due to the possibility of occurrence of severe torsional oscillations in the rotating portion of the apparatus at certain critical frequencies outside the normal safe frequency band, which may result in considerable destructive effect.

It is, therefore, desirable to provide an apparatus for detecting relatively small departures of system frequency from the normal operating frequency, and further to provide for warning an operator or disconnecting the converting apparatus from the power system when a dangerous departure from normal system frequency has been reached.

In its broadest aspects, my invention makes use of a motor of the synchronous type, designed to operate in synchronism with the frequency of an alternating current source over a considerable range of supply voltage, to drive a generator having a constant (preferably a permanent magnet) field supply to provide a signal voltage responsive only to the frequency of the supply voltage. The signal voltage thus provided is utilized to operate a sensitive relay through a nonlinear resonant circuit, the latter being employed to provide a high degree of sensitivity. The sensitive relay may be conveniently employed to operate a warning device or to disconnect apparatus from the supply system, as may be desired.

While the provision of a frequency responsive apparatus of the type mentioned is the primary object of my invention, other objects and advantages thereof will become apparent from a consideration of the following description taken in connection with the figures of the accompanying drawing, in which Fig. 1 represents a schematic diagram of a preferred embodiment of my invention, and Fig. 2 is a graphic representation of certain operating characteristics thereof.

Referring now to Fig. 1, I have shown an electric control circuit supplied with energy from a single-phase alternating current source 1, which may be, for example, an electric power system for an electric locomotive. Source 1 is represented as having a frequency $f_1$ and a voltage $V_1$. Frequency $f_1$, though nominally constant in magnitude, may actually vary over a range of several cycles per second due to transient effects and other causes. Voltage $V_1$, though likewise nominally constant in magnitude, may actually vary, due to line regulation, transient effects, and other causes, over a voltage range of two to one in the case of isolated power systems of the type mentioned. The complete circuit of Fig. 1 comprises generally a motor 2 of the synchronous type having its terminals connected to source 1, a generator 3 arranged to be driven by motor 2 at the exact speed thereof and having a voltage output $V_2$ with a frequency $f_2$, and a sensitive relay 4 supplied with energy from generator 3 through a nonlinear resonant circuit indicated generally at 5.

Motor 2 is represented as having a stator winding 6 and a rotor 7, the latter preferably being provided with a permanent-magnet insert to provide a high degree of synchronous locking torque at voltages considerably below the normal operating voltage of the motor. Winding 6 is represented as being of three-phase construction, although other winding constructions may be employed. A capacitor 8 is connected in series with one phase of winding 6 to facilitate starting of motor 2 with single-phase applied voltage. Generator 3 is preferably of the type having a rotating permanent-magnet field 9 and a stator winding 10, making the use of brushes unnecessary.

Motor 2 is represented as having two poles, while generator 3 is represented as having six poles. Since generator 3 is mechanically coupled to motor 2 and is driven at the speed thereof the ratio of the generated frequency $f_2$ to the supply frequency $f_1$ is identical with the ratio of the number of poles of generator 3 and motor 2, the ratio in the present embodiment being six to two or three to one. The pole ratio of generator 3 and motor 2 may be chosen to provide any convenient frequency for the operation of resonant circuit 5. If the supply frequency $f_1$ is nominally 25 cycles per second, as is common in power systems for locomotives, then, using the ratio noted above, the generator signal frequency $f_2$ is 75 cycles per second which I have found to be a convenient frequency for resonant circuit 5 as herein embodied.

Resonant circuit 5 comprises a capacitance 11 connected in series relation with a variable reactance 12, preferably having an iron core, and a second capacitance 13. The output terminals of generator 3 are connected to input terminals of resonant circuit 5 such that the combination of elements 11—13 is in parallel relation thereto and supplied with energy by voltage $V_2$. A full-wave rectifier 14, preferably of the dry-plate type, is connected to output terminals of said non-linear circuit such that it is in parallel relation with reactance 12 and capacitance 13. The output of rectifier 14 is filtered by a capacitor 15 and connected to the coil 16 of sensitive relay 4.

Relay 4 is represented as having a pair of normally open contacts, which may equally well be normally closed if desired. Contacts 17 may be employed in associated circuits (not shown) to effect operation of circuit-breaking apparatus, to sound warning signals, or to perform other functions in response to opening or closing of contacts 17.

The combination of generator 3, relay 4, and resonant circuit 5 of the present embodiment is similar in certain respects to the combination of corresponding elements in pending application Serial No. 794,546 of Charles A. Bauersfeld and Martin A. Edwards, filed December 30, 1947 and assigned to the same assignee as the present invention, which issued as Patent No. 2,502,119 on March 28, 1950. In particular, in an embodiment described in the aforementioned application, a sensitive relay is caused to operate at a predetermined frequency of a signal voltage of a tachometer generator, the latter being driven by the axle of a traction vehicle to provide a voltage having a frequency proportional to vehicle speed. Use is made of a nonlinear resonance circuit interposed between the generator voltage and the relay coil to sharpen the voltage rise with increasing frequency, to provide a high degree of sensitivity in the operation of the sensitive relay.

It will be understood that in the present invention a motor, operating in synchronism with the frequency of an alternating current source, is employed to drive a generator at a speed exactly proportional to the frequency of the source. Accordingly, such a motor forms an essential element of the frequency-responsive apparatus of the present invention, wherein a generator, a nonlinear resonant circuit, and a sensitive relay are likewise essential elements. The elements mentioned are herein embodied by motor 1, generator 2, resonant circuit 5, and relay 4.

The operation of my invention may best be understood by reference to Fig. 2, wherein certain operating characteristics of the arrangement represented in Fig. 1 are shown. In particular, characteristic 18 represents the A. C. voltage output $V_2$ of generator 10 plotted against generator frequency $f_2$, the latter being axactly proportional to frequency $f_1$ of source 1, as previously explained. It will be noted that characteristic 18 is a straight line since generator 10 is provided with substantially constant excitation by permanent magnet rotor 9.

Characteristic 19 represents the D. C. voltage $V_3$, impressed across coil 16 of relay 4, plotted as a function of frequency $f_2$ of voltage $V_2$, the latter being impressed across the terminals of resonant circuit 5. By the use of resonant circuit 5 the slope or rate of change of voltage $V_3$ is substantially increased over the slope or rate of change of voltage $V_2$ in a particular frequency range. This effect is illustrated in Fig. 2 by the portion of curve 19 lying approximately between 60 and 80 cycles per second (C. P. S.). In other words, a change of frequency $f_2$ from 70 to 75 C. P. S., for example, causes $V_3$ to change approximately 20-25 volts, while the corresponding change of $V_2$ is approximately only 4-5 volts. By providing such a sharpening of voltage change through the use of nonlinear resonant circuit 5, relatively small changes in frequency $f_2$ (or $f_1$) may be more readily and reliably detected than would be the case if voltage $V_2$ were employed directly in the operation of relay 4.

In describing the sequence of operation of my invention as herein embodied, it is first assumed that the apparatus of Fig. 1 has been previously disconnected from source 1. Under this condition motor 2 and generator 3 are at standstill and voltages $V_2$ and $V_3$ are zero, causing relay 4 to be de-energized and contacts 17 to be open. It is now assumed that motor 2 is connected to source 1 and that rotor 7 thereof is caused to accelerate from standstill to a speed corresponding to frequency $f_1$, assumed to be nominally 25 C. P. S., at which speed rotor 7 becomes synchronously locked with frequency $f_1$ and thereafter varies in speed in accordance with changes of $f_1$ over a wide range of voltage $V_1$. Rotor 9 of generator 3, being coupled mechanically to rotor 7 of motor 2, is likewise accelerated from standstill and is driven at the synchronous speed of rotor 7. Stator winding 10 of generator 3, therefore, is caused to provide voltage $V_2$ having frequency $f_2$, the latter being exactly proportional to frequency $f_1$ of source 1, as previously explained. As rotor 9 is accelerated, voltages $V_2$ and $V_3$ increase according to characteristic curves 18 and 19, respectively, in Fig. 2, to points thereon corresponding to a value of $f_2$ of 75 C. P. S.

It is assumed in the operation of the apparatus herein embodied, that pickup of relay 4 is effected at a value of $f_2$ slightly below the nominal operating value of 75 C. P. S., for example at approximately 73 C. P. S., and that dropout of relay 4 is effected when frequency $f_2$ falls to 69 C. P. S., the latter value corresponding to a value of $f_1$ of 23 C. P. S. Contacts 17, which may be connected in associated control circuits (not shown), are accordingly closed and opened by pickup and dropout of relay 4 at the respective values of $f_2$ noted.

It will be understood by those skilled in the art that the pickup and dropout voltages of relay 4 are established by adjustment of the physical constants of relay 4, and that reference to characteristic 19 may be conveniently made to determine the approximate values of voltage $V_3$ corresponding to the frequency values at which relay 4 is to operate. Relay 4 is therefore adjusted so that the voltage differential between pickup and dropout is approximately equal to the differential of voltage $V_3$ corresponding to the desired dropout frequency (assumed to be 69 C. P. S) and the pickup frequency previously established (assumed to be 73 C. P. S.). Broken lines 20 and 21 in Fig. 2 indicate pickup and dropout voltages, respectively, of relay 4 for the assumed conditions.

While the approximate frequencies at which pickup and dropout of relay 4 occur may be established by the adjustment of relay 4, the exact value of frequency $f_2$ at which relay 4 is caused to drop out, which is of primary importance in the functioning of the apparatus herein embodied, may be conveniently adjusted by varying the setting of variable reactor 12, which causes curve 19 to be shifted to the right or left, while the general shape thereof remains substantially unchanged. Varying the setting of reactor 12, however, causes the frequencies at which pickup and dropout of relay 4 occur to be similarly affected. Therefore, adjustment of the frequency at which dropout of relay 4 occurs is limited, for a given pickup and dropout differential, to a value which maintains the pickup frequency below the nominal operating value of frequency $f_1$ of 75 C. P. S., to assure pickup of relay 4 under initial starting conditions.

When, after connection of motor 2 to source 1, full speed has been reached by rotors 7 and 9 and pickup of relay 4 has been effected, a normal operating condition of the frequency-responsive apparatus is established. Thereafter, while frequency $f_1$ remains above the critical frequency at which dropout of relay 4 occurs (23 C. P. S.), the previously established normal operating condition remains undisturbed. However, when frequency $f_1$ falls below the critical frequency, due, for example, to transient conditions affecting source 1, dropout of relay 4 occurs and contacts 17 are caused to open, providing a control signal which may be employed to disconnect associated apparatus from source 1, or to perform other desired control functions.

In the embodiment described herein, an arrangement has been shown whereby a control function may be performed in response to a decrease in frequency of a source from a normal operating value to a predetermined minimum value. It will be understood by those skilled in the art, however, that an arrangement may equally well be made to perform such a control function in response to an increase in frequency of a source to a predetermined maximum value, by making use of the pickup characteristic of a sensitive relay, such as relay 4. In such an arrangement particular attention is preferably given to exact adjustment of the frequency at which pickup of the relay occurs. Such adjustment may be conveniently made, as in the embodiment herein described, by varying the setting of a variable reactor, such as reactor 12.

While I have shown and described a preferred embodiment of my invention, it will be understood that my invention may well take other forms and I, therefore, aim in the appended claims to cover all such changes and modifications as fall within the true spirit and scope of my invention.

What I claim as new and desire to secure by Letters Patent of the United States is:

1. A frequency-responsive control system, comprising a source of alternating voltage, a synchronous motor arranged to be connected to said source, said motor having a speed responsive to the frequency of said source, a generator driven by said motor and having an output voltage responsive in frequency and in amplitude to the frequency of said source, a non-linear resonant circuit connected thereacross to be supplied with the output voltage from said generator, said non-linear circuit including serially connected inductive and capacitive reactances, the magnitude of the output voltage of said non-linear circuit taken across a portion of said reactances deviating sharply from the magnitude of the voltage supplied thereto from said generator at a particular frequency thereof, and a relay connected across said portion of said non-linear circuit to pick up in response to a predetermined value of the magnitude of the output voltage of said non-linear circuit.

2. A frequency-responsive control system, comprising a source of alternating voltage, a synchronous motor arranged to be connected to said source, said motor having a speed responsive to the frequency of said source, a generator driven by said motor and having an output voltage responsive in frequency and in amplitude to the frequency of said source, a non-linear circuit including an inductor and a capacitor serially connected to be supplied thereacross with the output voltage from said generator, the magnitude of the output voltage of said non-linear circuit appearing across said inductor deviating sharply from the magnitude of the output voltage of said generator at a particular frequency thereof, and a relay connected to be supplied with a voltage from across said inductor to pick up at a value of output voltage of said non-linear circuit above a predetermined value and to drop out at said predetermined value.

3. A frequency-responsive control system, comprising a source of alternating voltage, a synchronous motor arranged to be connected to said source, said motor having a speed responsive to the frequency of said source, a generator driven by said motor and having an output voltage responsive in frequency and amplitude to the frequency of said source, a non-linear resonant circuit including an inductor and a capacitor serially connected to be supplied with the output voltage from said generator, the magnitude of the output voltage of said non-linear circuit appearing across said inductor deviating sharply from the magnitude of the output voltage of said generator at a particular frequency thereof, and a relay connected to be supplied with a voltage from across said inductor of said non-linear circuit to pick up in response to a value of output voltage of said non-linear circuit between a pair of predetermined values thereof and to drop out at the lower of said predetermined values.

4. A frequency-responsive control system, comprising a synchronous motor arranged to be connected to a source of voltage, said motor having a speed responsive to the frequency of said source, a generator driven by said motor and having an output voltage responsive in frequency and in amplitude to the frequency of said source, a non-linear resonant circuit connected thereacross to be supplied with the output voltage from said generator, said non-linear circuit including serially connected inductive and capacitive reactances, the magnitude of the output voltage of said non-linear circuit taken across a portion of said reactances deviating sharply from the magnitude of the voltage supplied thereto from said generator at a particular frequency thereof, and a relay connected across said portion of said non-linear circuit to pick up in response to a predetermined value of the magnitude of the output voltage of said non-linear circuit.

PHILIP F. DESCH.

REFERENCES CITED

The following references are of record in the file of this patent:

UNITED STATES PATENTS

| Number | Name | Date |
| --- | --- | --- |
| 1,401,654 | Shepard | Dec. 27, 1921 |
| 1,505,158 | Martin | Aug. 19, 1924 |
| 1,943,524 | Godsey | Jan. 16, 1934 |
| 1,994,325 | Suits | Mar. 12, 1935 |
| 2,231,174 | Trogner | Feb. 11, 1941 |